United States Patent [19]
Saito et al.

[11] Patent Number: 5,497,184
[45] Date of Patent: Mar. 5, 1996

[54] LASER SCANNING SYSTEM

[75] Inventors: Taizo Saito, Tokyo; Nobuaki Nakano, Kawagoe; Hiroto Watanabe, Kiyose; Toshihisa Ohno, Sakado; Yoshiyuki Araki, Tokyo, all of Japan

[73] Assignee: Asahi Kogaku Kogyo Kabushiki Kaisha, Tokyo, Japan

[21] Appl. No.: 480,867

[22] Filed: Jun. 7, 1995

Related U.S. Application Data

[63] Continuation of Ser. No. 136,027, Oct. 14, 1993, abandoned, which is a continuation of Ser. No. 691,411, Apr. 25, 1991, abandoned.

[51] Int. Cl.$^6$ ........................................... B41J 2/435
[52] U.S. Cl. ........................................... 347/257; 347/263
[58] Field of Search .................................. 347/257, 263, 347/243, 138; 358/296, 298, 300, 302

[56] References Cited

U.S. PATENT DOCUMENTS

| | | |
|---|---|---|
| 4,338,577 | 7/1982 | Sato et al. . |
| 4,403,243 | 9/1983 | Hakamada . |
| 4,868,673 | 9/1989 | Negoro ............................ 346/108 |
| 4,918,306 | 4/1990 | Saito . |
| 5,046,795 | 9/1991 | Morimoto et al. . |
| 5,067,782 | 11/1991 | Morimoto et al. . |
| 5,130,840 | 7/1992 | Iima et al. . |
| 5,162,938 | 11/1992 | Iima et al. . |
| 5,247,373 | 9/1993 | Iwama et al. . |
| 5,327,280 | 7/1994 | Morimoto ............................ 359/216 |

FOREIGN PATENT DOCUMENTS 62-254566  11/1987  Japan .

OTHER PUBLICATIONS

English Translation of JP 62-254566.

*Primary Examiner*—Mark J. Reinhart
*Attorney, Agent, or Firm*—Greenblum & Bernstein

[57] ABSTRACT

A laser scanning system in which a laser beam is emitted by a laser source and repeatedly deflected by a deflector, such as a polygon mirror. A photo sensor is provided to detect the position of the deflected laser beam. The photo sensor and the laser source are mounted on a common support member so that the laser beam, deflected by the polygon mirror, directly enters the light receiving portion of the photo sensor. Optionally, a reflection mirror is provided such that the deflected laser beam is reflected by the reflection mirror and further deflected to the photo sensor by the polygon mirror.

22 Claims, 9 Drawing Sheets

LASER SCANNING SYSTEM

This application is a continuation of application Ser. No. 08/136,027, filed Oct. 14, 1993, now abandoned, which is a continuation of application Ser. No. 07/691,411, filed Apr. 25, 1991, now abandoned.

BACKGROUND OF THE INVENTION

The present invention relates to a laser scanning system, more specifically, a beam position detecting structure for detecting a beam position in the scan line of a laser beam.

Recently, the laser printer has become popular as an image forming apparatus, and well known is its function of forming a hard copy of image data onto a recording sheet with use of a so-called electrophotographic image forming process.

The electrophotographic image forming process may include the following steps:

the circumferential surface of a photoconductive drum is uniformly charged with a corona charger;

the surface of the photoconductive drum is then scanned with the laser beam which is ON/OFF modulated in accordance with the image data to be printed;

electrostatic voltage at the exposed portion of the photoconductive drum is decreased and a latent image is formed;

charged toner is attracted to the discharged position and the latent image is developed;

the developed latent image, or toner image is electrically attracted and transferred to a recording sheet; and the transferred toner image is then fused and fixed by being heated/pressed at a fixing unit.

Also becoming popular is a laser photo-plotter, which depicts an original plate, such as a printed board, on a surface of a photoconductive material by using a laser beam scanning method.

In a laser beam scanning system, a laser beam emitted from a semiconductor laser is deflected by a deflecting device and then scans a predetermined angle zone.

In the prior art, there have been provided various methods for deflecting the laser beam and performing the scanning of the laser beam. Among them, generally known is a method wherein the laser beam scanning is performed by rotating a rotatable mirror, such as a polygon mirror, which has a plurality of reflection surfaces, or a galvanometer. For such methods, utilization of a semiconductor laser as a laser source is becoming popular and well recognized, since the semiconductor laser make it possible to make the apparatus compact in size and to reduce production cost.

Figure 9:
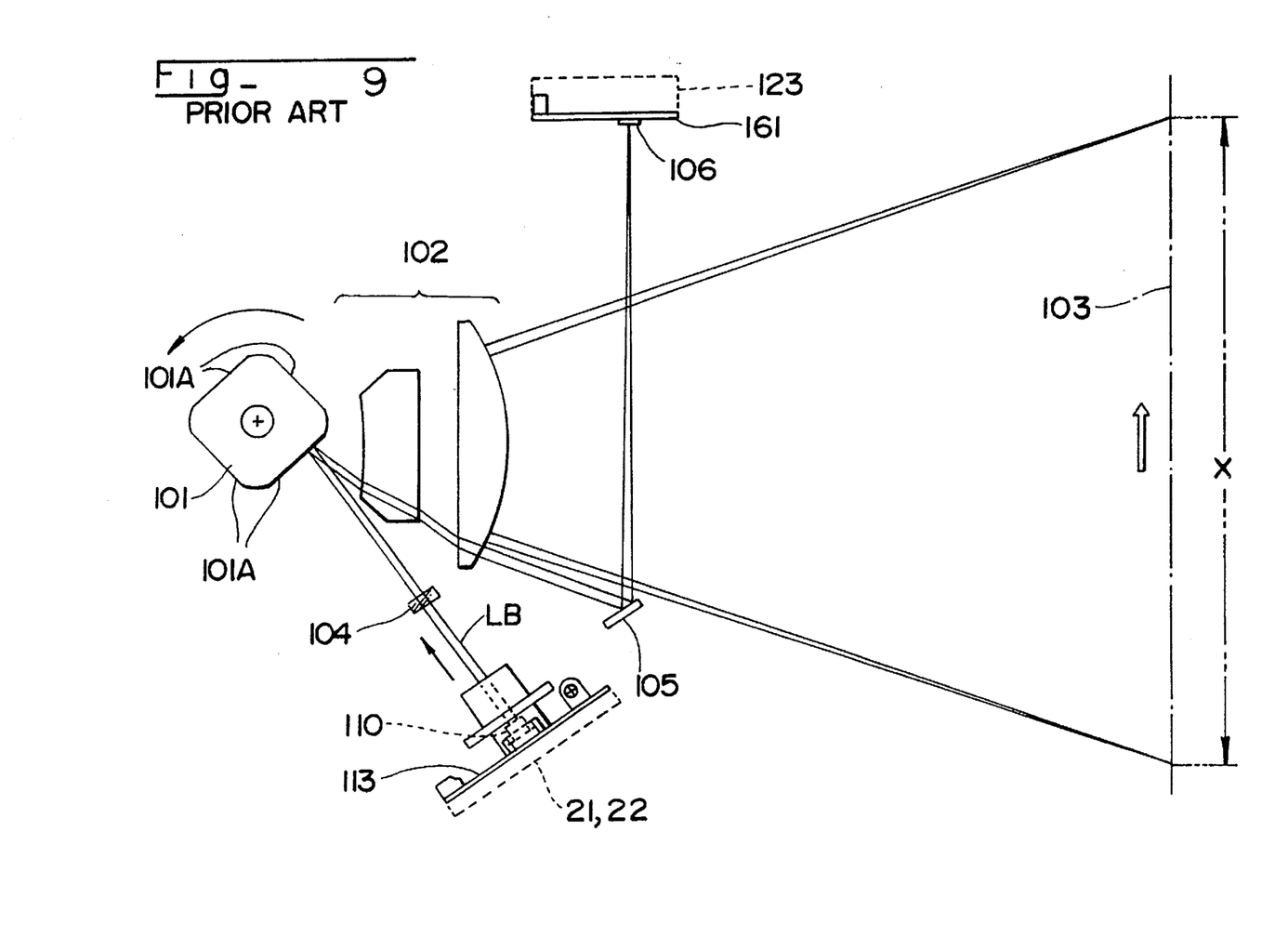
FIG. 9 is a schematic plan view of a conventional scanning optical system.

FIG. 9 shows an example of a known laser scanning system. In the laser scanning system, laser beam LB is emitted from a semiconductor laser 110 and deflected by a reflection surface 101A formed on a side wall of a polygon mirror 101. The polygon mirror 101 is rotatably driven to change the angle of the reflection surface so that the laser beam LB is deflected to repeatedly scan a predetermined angle zone X which corresponds to the image-forming zone of the circumferential surface of a photoconductive drum 103.

In laser beam printers, it is necessary to synchronize a modulation of the laser beam with its scanning operation. Therefore, in the laser scanning system of FIG. 9, there is provided a photo sensor 106 for detecting the laser beam LB in order to adjust the starting point of ON/OFF modulation of the laser beam in each scanning (in each scan line). The photo sensor 106 is arranged at the edge portion outside of the predetermined angle zone X so as not to affect the formation of a latent image on the circumferential surface of the photoconductive drum 103.

Further, a reflection mirror 105 is provided for directing the deflected laser beam LB to the photo sensor 106 before the laser beam LB scans the predetermined angle zone X. In order not to affect the image formed on the circumferential surface of the photoconductive drum 103, the reflection mirror 105 and the photo sensor 106 are oppositely disposed with respect to the predetermined angle zone X. In other words, the reflection mirror 105 and the photo sensor 106 are arranged on the leading end and trailing end sides outside of the predetermined angle zone X, when seen in the scanning direction of the laser beam LB, respectively. In this case, the reflection mirror 105 is arranged such that the optical path lengths between the semiconductor laser 110 and the circumferential surface of the photoconductive drum 103 so that it, equals that between the semiconductor laser 110 and the photo sensor 106.

The photo sensor 106 receives the laser beam LB, reflected by the reflection mirror 105, and generates a signal indicating a detection of the laser beam LB. Thus, the signal generated by the photo sensor 106 is utilized as a horizontal synchronous signal to be transmitted to a horizontal synchronization detecting circuit. Namely, the beam position of the scanning laser beam LB can be determine upon the detection of the laser beam LB by the photo sensor 106 by way of the reflection mirror 105. The latent image is formed from a predetermined position on the circumferential surface of the photoconductive drum 103 in accordance with the signal obtained by the photo sensor.

In the laser scanning system described as above, the semiconductor laser 110 and the photo sensor 106 are installed on respective base plates 113 and 161, which are fixedly disposed in a housing (not shown). The base plate 113, installing the semiconductor 110, is further equipped with a driving circuit 121 for driving the semiconductor laser 110, and an automatic power control circuit 122 for feedback-controlling the output of the semiconductor laser 110. While the other base plate 161, installing the photo sensor 106, is further equipped with a synchronous signal detecting circuit 123.

Reference numeral 102 denotes an fθ lens as a scanning lens which corrects the scanning speed of the laser beam LB so that the scanning speed on the circumferential surface of the photoconductive drum 103 is proportional to the deflected angle of the laser beam LB. Reference numeral 104 is a cylindrical lens which focuses the laser beam LB on a line perpendicular to a rotational axis of the polygon mirror 101 in order to minimize the affect of the tilt of the reflection surface 101A of the polygon mirror 101.

However, in such an arrangement for detecting a laser beam scanning position, it should be noted that both a mirror for reflecting the laser beam and a photo sensor for detecting the laser beam are independently provided in the system. Accordingly, the number of parts increases and the apparatus itself becomes structurally complicated. Furthermore, each of the increased number of parts has to be accurately installed in the apparatus. Therefore, such a structure would cause a problem from the viewpoint of increased total parts cost and installation cost.

There is also known another laser scanning system, In which the photo sensor and the control unit are provided on the same base plate. An optical fiber is provided such that one end of the optical fiber is placed at the optically equivalent position to the circumferential surface of the photoconductive drum, and the laser beam, emitted at the other end of the optical fiber, is received by the photo sensor. Thus, the laser beam reflected by the reflection device is received by the photo sensor by way of the optical fiber.

In accordance with this arrangement, when compared with the laser scanning system of FIG. 9, it becomes possible to install the synchronous signal detecting circuit and the control unit on the same base plate. Therefore, the base plate provided for mounting the photo sensor In the scanning system of FIG. 9 can be omitted. That is, the base plate in this second example can serve as not only the base plate for the control unit but the base plate for the photo sensor. It results in that the installation of the overall system is simpler and the overall production cost can be reduced.

However, even in this arrangement, there is a problem in that a part of the laser beam leaks out of the optical fiber, and the total quantity of light transmitted to the photo sensor becomes insufficient to accurately detect the laser beam.

SUMMARY OF THE INVENTION

It is therefore an object of the present invention to provide an improved laser scanning system comprising a beam position detecting device which avoids the aforementioned problems and disadvantages encountered with the prior arts, and is capable of accurately detecting the laser beam position with a simplified arrangement and reduced total cost.

For the above objects, according to the present invention, there is provided a laser scanning system for an electrophotographic image recording apparatus having a photoconductive material exposed to a laser beam, which includes:

a laser source for emitting a laser beam;

a deflecting device for deflecting the laser beam emitted by the laser source so that the laser beam repeatedly scans at least a predetermined angle zone;

a light receiving device for receiving the deflected laser beam before the predetermined angle zone 1s scanned by the deflected laser beam; and a mounting member for mounting the laser source and the light receiving device.

Optionally, the deflecting device comprises a polygon mirror which can be rotatably driven.

Further, the laser source may be a semiconductor laser.

Furthermore, the mounting member is provided on the leading end side with respect to the predetermined angle zone when seen in the scanning direction of the deflected laser beam.

Further, the laser scanning system comprises a converging lens arranged between the deflecting device and the light receiving device for causing the deflected laser beam to focus on the light receiving portion of the light receiving device.

Further optionally, the laser scanning system includes a reflection device for reflecting the laser beam deflected by the deflecting device to the light receiving device.

Still further, the semiconductor laser includes a laser diode for emitting laser beam in forward and backward direction simultaneously, and a monitor diode arranged behind the laser diode for detecting the magnitude of the laser beam emitted by the laser diode.

According to another aspect of the invention, there is provided a laser scanning system including:

a laser source for emitting a laser beam;

a deflecting device for deflecting the laser beam emitted by the laser source so that the laser beam repeatedly scans at least a predetermined angle zone; and a light receiving device for receiving the deflected laser beam before the predetermined angle zone is scanned by the deflected laser beam, wherein the laser source and the light receiving device are arranged on the same side with respect to the predetermined angle zone.

Optionally, the light receiving device and the laser source are arranged on the leading end side with respect to the predetermined angle zone when seen in the scanning direction of the deflected laser beam.

Further, the light receiving device and the laser source may be arranged on the trailing end side with respect to the predetermined angle zone when seen in the scanning direction of the deflected laser beam.

DESCRIPTION OF THE ACCOMPANYING DRAWINGS

FIG. 4 (A) is a time chart showing output signals obtained from a monitor photo diode;

FIG. 4 (B) Is a time chart showing output signals obtained from a horizontal synchronous signal detecting circuit;

DESCRIPTION OF THE EMBODIMENTS

[First embodiment]

Figure 1:
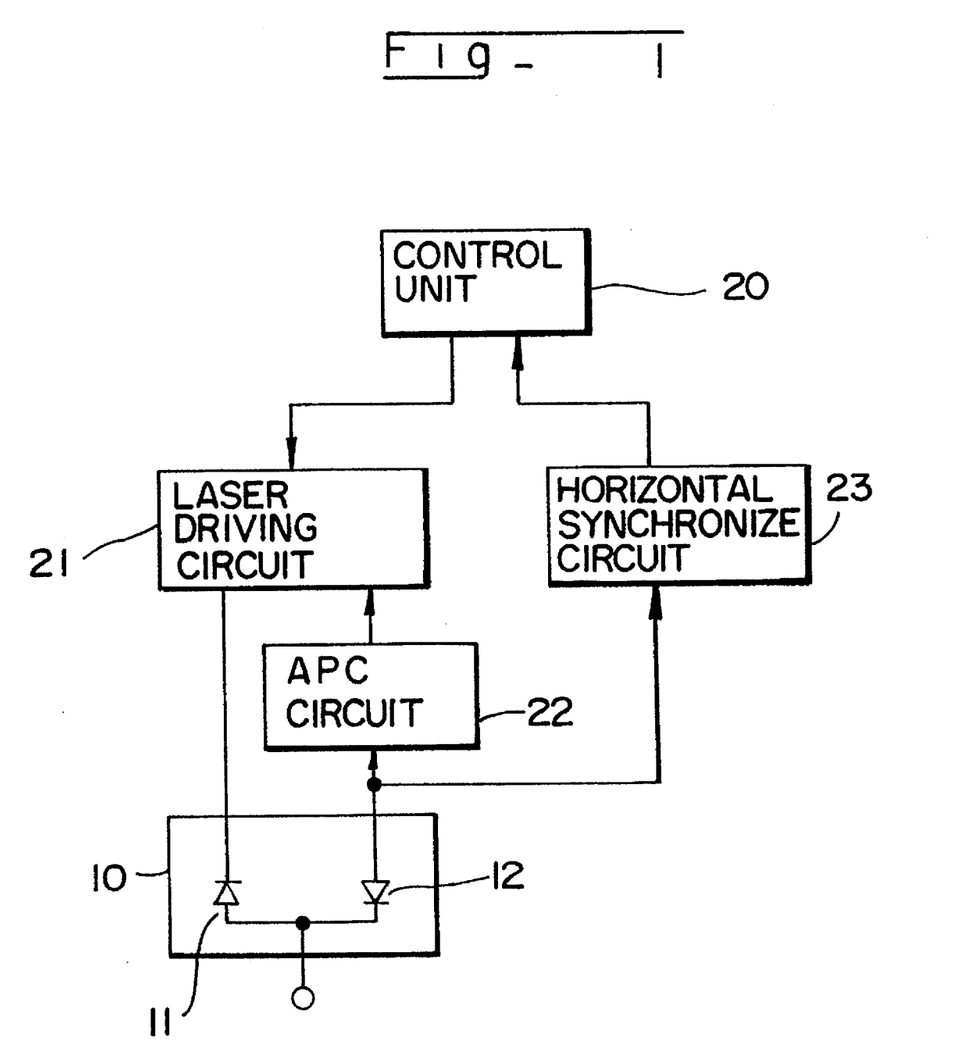
FIG. 1 is a block diagram showing a beam position detecting device for a laser beam scanning system in accordance with the present invention.
Figure 2:
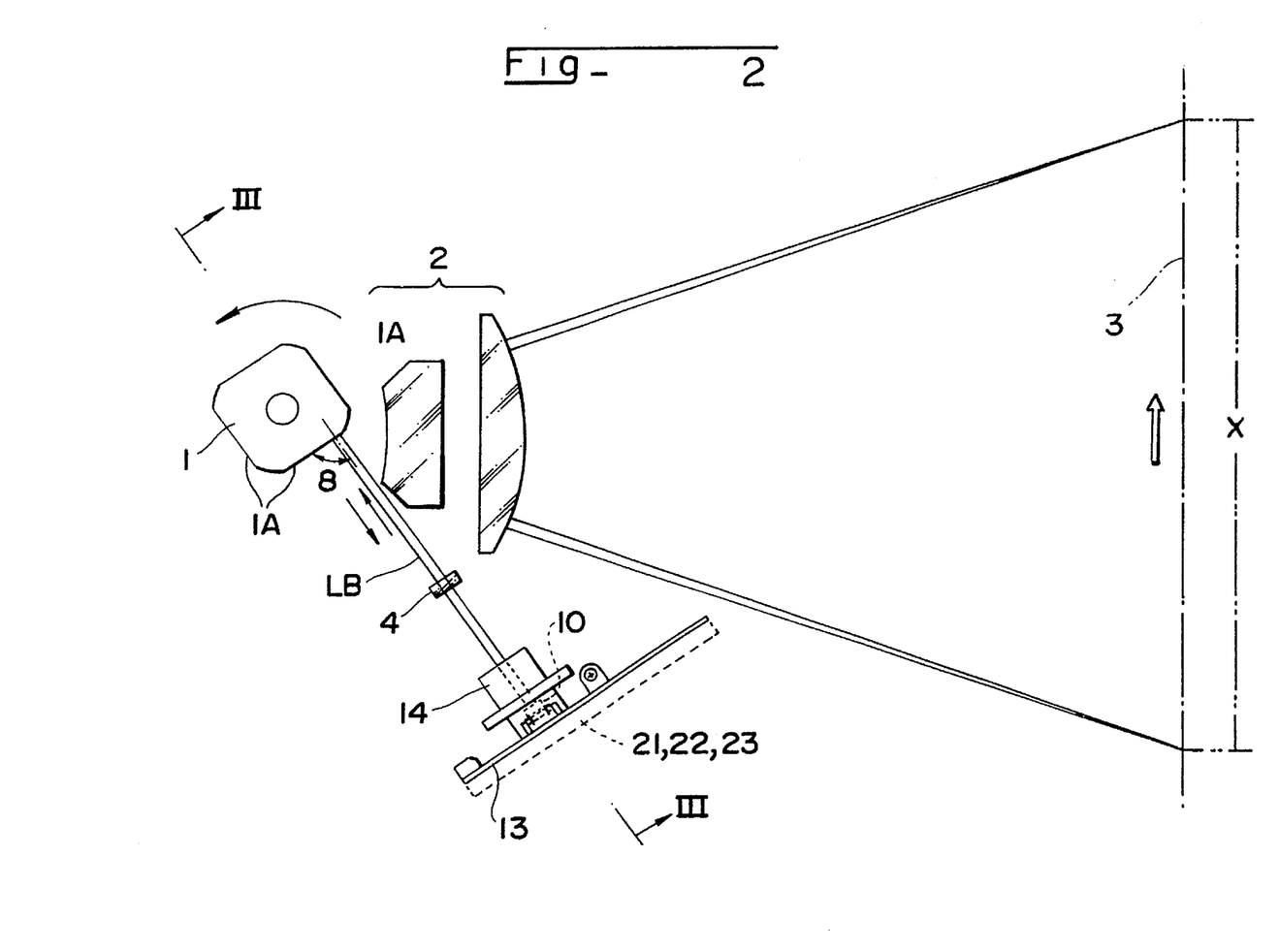
FIG. 2 is a schematic plan of a scanning optical system showing a first embodiment of the beam position detecting device.

FIG. 1 shows a block diagram of a beam position detecting device for the laser beam scanning system in accordance with the present invention. FIG. 2 is a schematic view of a scanning optical system of a laser printer, which has a first embodiment of the beam position detecting device for the laser beam scanning system.

The laser beam printer apparatus is used as an external output device for a computer and the like. The laser beam printer is controlled to perform a laser beam scanning operation in the axial direction of a photoconductive drum 3, wherein the laser beam is ON/OFF modulated, based on a dot-image to be printed (a main scanning operation). The laser beam also performs a rotational operation of the photoconductive drum 3 about its axis for a secondary scanning operation. Thus image information can be transferred onto recording paper by means of toner with use of a so-called electrophotographic image forming process.

In the scanning optical system of FIG. 2, a polygon mirror 1 is used as a deflection device to perform the laser beam scanning operation. A laser beam LB emitted from a semiconductor laser 10, which is provided as a laser modulator, is deflected by the polygon mirror 1 so as to scan a surface on a photoconductive drum 3. The polygon mirror 1, an fθ lens 2 utilized as a scanning lens, a cylindrical lens 4 and the semiconductor laser 10 are disposed so as to maintain a mutually predetermined relationship among their positions. That is, the direction and position of the semiconductor laser 10 is fixed so as to emit laser beam LB toward the polygon mirror 1 in a predetermined direction. The cylindrical lens 4 is disposed between the semiconductor laser 10 and the polygon mirror 1 in such a manner that a cylindrical axis of the cylindrical lens 4 coincides with a direction orthogonal to a rotational axis of the polygon mirror 1. Further, the fθ lens 2 is disposed between the polygon mirror 1 and the photoconductive drum 3.

In other words, the position of the semiconductor laser 10 is determined so as to satisfy the conditions such that the laser beam LB, emitted from the semiconductor laser 10, can scan a predetermined angle zone X on the circumferential surface of the photoconductive drum 3 as a result of the changing angle of the reflection surface 1A which is caused by a rotation of the polygon mirror 1. The semiconductor laser 10 is located within the deflecting zone and out of the predetermined angle zone X. That is, the semiconductor laser 10 is disposed at a leading side of the scan line of the laser beam and out of the predetermined angle zone X. The predetermined angle zone X corresponds to an image-forming region on the photoconductive drum 3. Namely, it is designed that the reflection surface 1A of the polygon mirror 1 can face the semiconductor laser 10 so that the incident angle of the laser beam LB becomes orthogonal to the reflection surface 1A before the laser beam LB commences scanning of the predetermined angle zone X on the circumferential surface of the photoconductive drum 3. In other words, the laser beam LB, deflected by the polygon mirror 1, scans the semiconductor laser 10 before it scans the predetermined angle zone X on the circumferential surface of the photoconductive drum 3.

Figure 3:
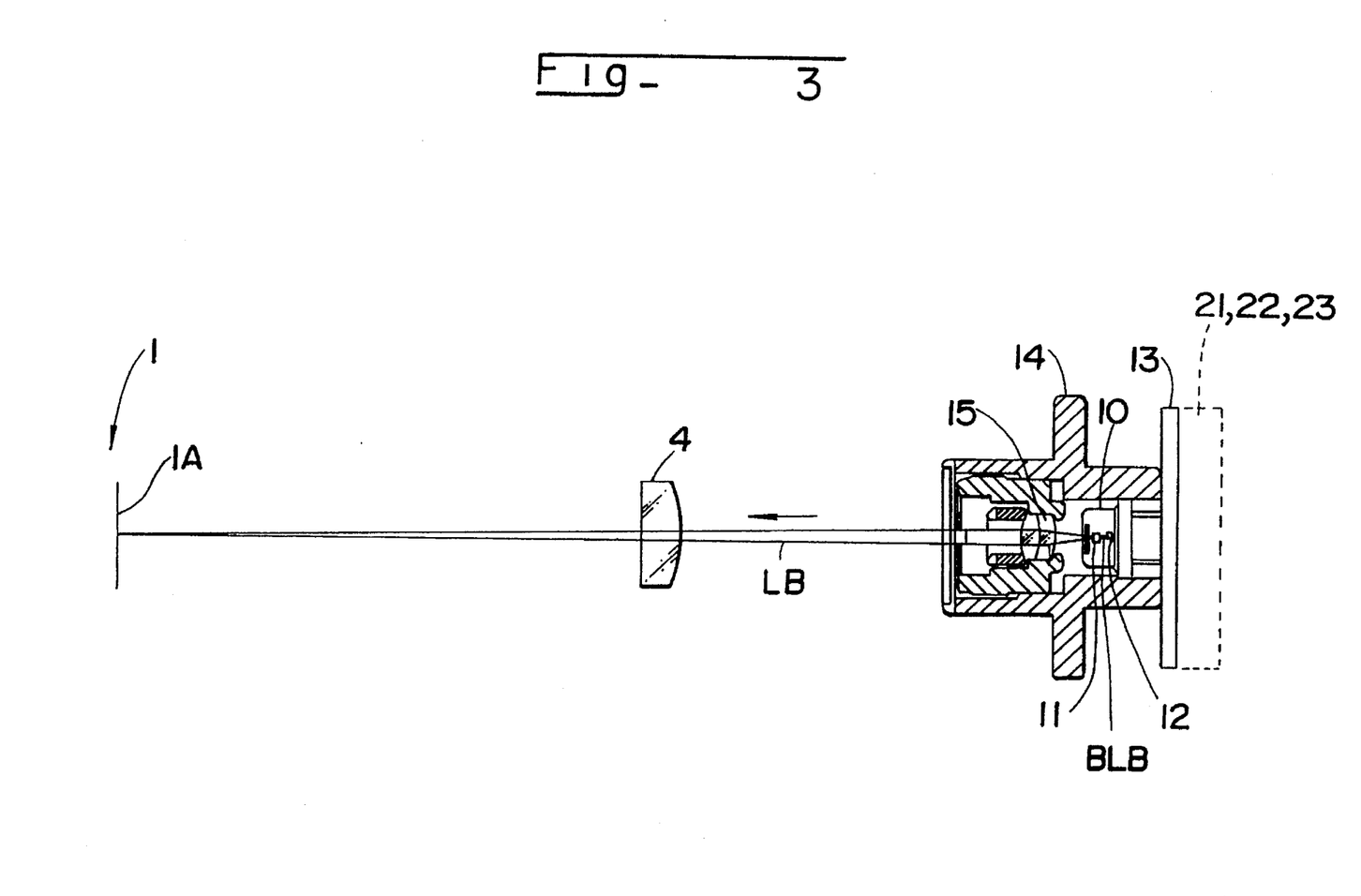
FIG. 3 is a cross-sectional view taken along a line III—III in FIGS. 2, 6 and 8.

The semiconductor laser 10 is, as shown in FIG. 3 which corresponds to a cross-sectional view taken along a line III—III in FIG. 2, installed on a base plate 13. The base plate 13 and the semiconductor laser 10 are integrally fixed on a base member (not shown) of the scanning optical system by device of a holder, inside of which is equipped with a collimator lens 15.

The semiconductor laser 10 is, as shown in FIG. 1, actuated by a laser driving circuit 21. The laser driving circuit 21 is controlled by a control unit 20 which performs an overall control of the laser beam printer using this scanning optical system, so as to modulate the laser beam LB In response to commands sent out from the control unit 20, with the command being based on image information.

Since the power of the output light fluctuates due to ambient temperature variations. The laser beam is emitted in opposite directions from a laser diode 11 simultaneously. In the scanning optical system according to the present invention, there is provided a monitor photo diode 12 which detects one of two laser beams emitted in backward and forward directions (i.e. the laser bean BLB which is emitted backward in this embodiment) from the laser diode 11. Further, there is provided an automatic power control circuit 22 (APC circuit). The automatic power control circuit 22 generates the signal corresponding to the laser beam detected by the monitor photo diode 12 and outputs the same to the laser driving circuit 21 to control the feedback of the power of the output light power of the laser diode 11.

The laser beam output signal detected by the monitor photo diode 12 is also transmitted to the horizontal synchronous signal detecting circuit 23.

In the horizontal synchronous signal detecting circuit 23, the laser beam detected by the monitor photo diode 12 is compared with a predetermined standard voltage in a comparator. If the output voltage from the monitor photo diode 12 exceeds the predetermined standard voltage, the output signal of the horizontal synchronous signal detecting circuit 23 changes.

The laser driving circuit 21, the automatic power control circuit 22, and the horizontal synchronous signal detecting circuit 23 are incorporated on the base plate 13, on which the semiconductor laser 10 is mounted.

The output signal frown the horizontal synchronous signal detecting circuit 23 is supplied to the control unit 20, then the control unit 20 controls the laser driving circuit 21, using the signal inputted from the synchronous signal detecting circuit 23, so that the scanning operation of the laser bean LB can synchronize with the modulation of the laser beam LB.

Thus, in the beam position detecting device for the laser beam scanning system constituted as described above, the laser beam LB, emitted from the semiconductor laser 10 and deflected by the polygon mirror 1, can scan the semiconductor laser 10 before scanning the predetermined angle zone X on the circumferential surface of the photoconductive drum 3, because of above-described positional relationship between the semiconductor laser 10 and the polygon mirror 1. That is, the laser beam LB, emitted from the semiconductor laser 10, is returned to the semiconductor laser 10 when the polygon mirror 1 is located at the position where the reflection surface 1A of the polygon mirror 1 is orthogonal to the incident laser beam LB.

Figure 4A:
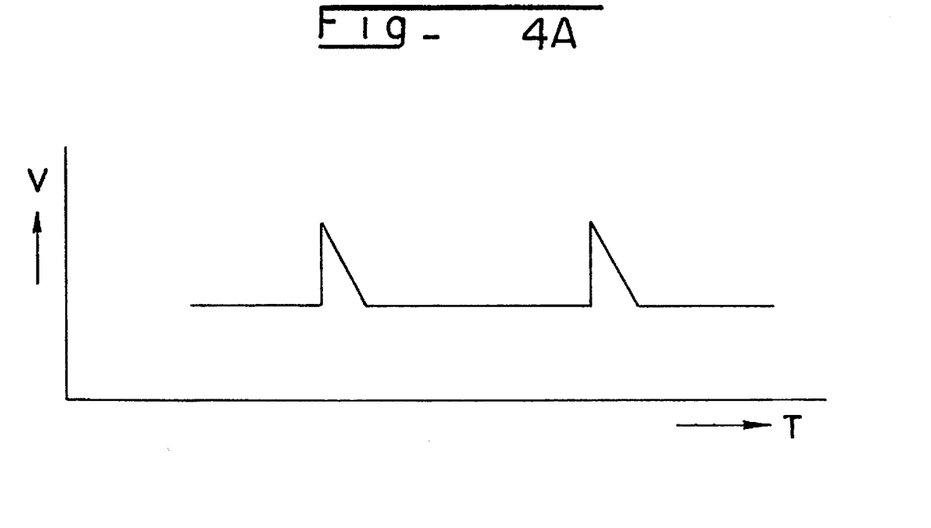

Meanwhile, the monitor photo diode 12 of the semiconductor laser 10 detects the deflected laser beam LB as well as non-deflected laser beam (the laser beam emitted backward by the laser diode 11), and consequently, the monitor photo diode 12 outputs pulse signals, as shown in FIG. 4 (A). The magnitude of the pulse signal, when the monitor photo diode 12 detects the deflected laser beam is substantially twice as large as that of the normal value.

Figure 4B:
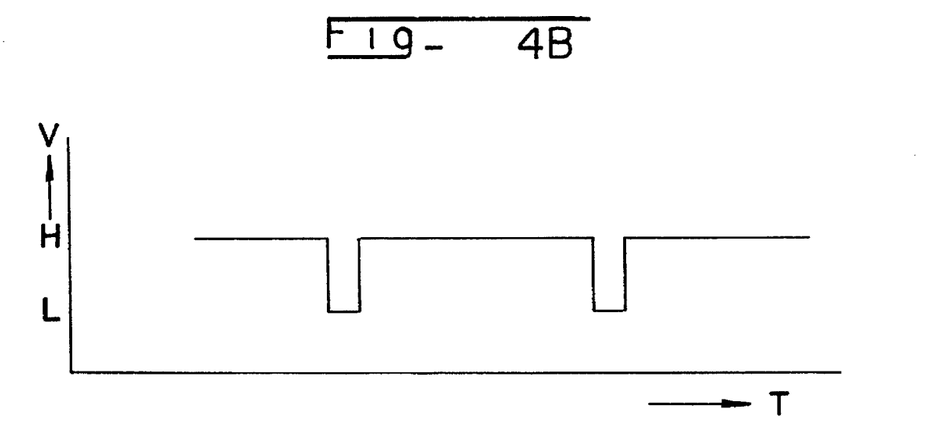

The horizontal synchronous signal detecting circuit 23, upon receiving the pulse signals from the monitor photo diode 12, sends out to the control unit 20 rectangular wave form signals, which correspond to the pulse signals, as shown in FIG. 4 (B).

As is described above, the pulse signal from the monitor photo diode 12 (the rectangular wave form signal from the horizontal synchronous signal detecting circuit 23) is outputted only when the deflected laser beam LB scans the semiconductor laser 10, therefore, the beam position of the laser beam LB can be determined by this pulse signal. In other words, it becomes possible to modulate the laser beam LB synchronously with the scanning operation thereof when the control unit 20 controls the laser driving circuit 21, using the rectangular wave form signal delivered from the horizontal synchronous signal detecting circuit 21 as the synchronous signal.

As described above, in accordance with the first embodiment of the beam position detecting device for the laser beam scanning system, it becomes possible to omit the reflection mirror and the photo sensor incorporated with each other to detect the position of the scanning laser beam. Thereby, the number of the parts decreases and the system becomes structurally simple, and as a result, the production cost can be reduced.

Further, it becomes possible to install a plurality of circuits, relating to the actuation of the semiconductor laser and the detection of the laser beam position, on the same base plate, therefore, additional cost reduction can be achieved.

In addition, in this embodiment, the synchronous signal can be obtained at higher accuracy, since the laser beam does not go through any other optical element except for the semiconductor laser and the deflection device, thus there is higher accuracy because of their mutual relationship in installation position.

[Second embodiment]

Figure 5:
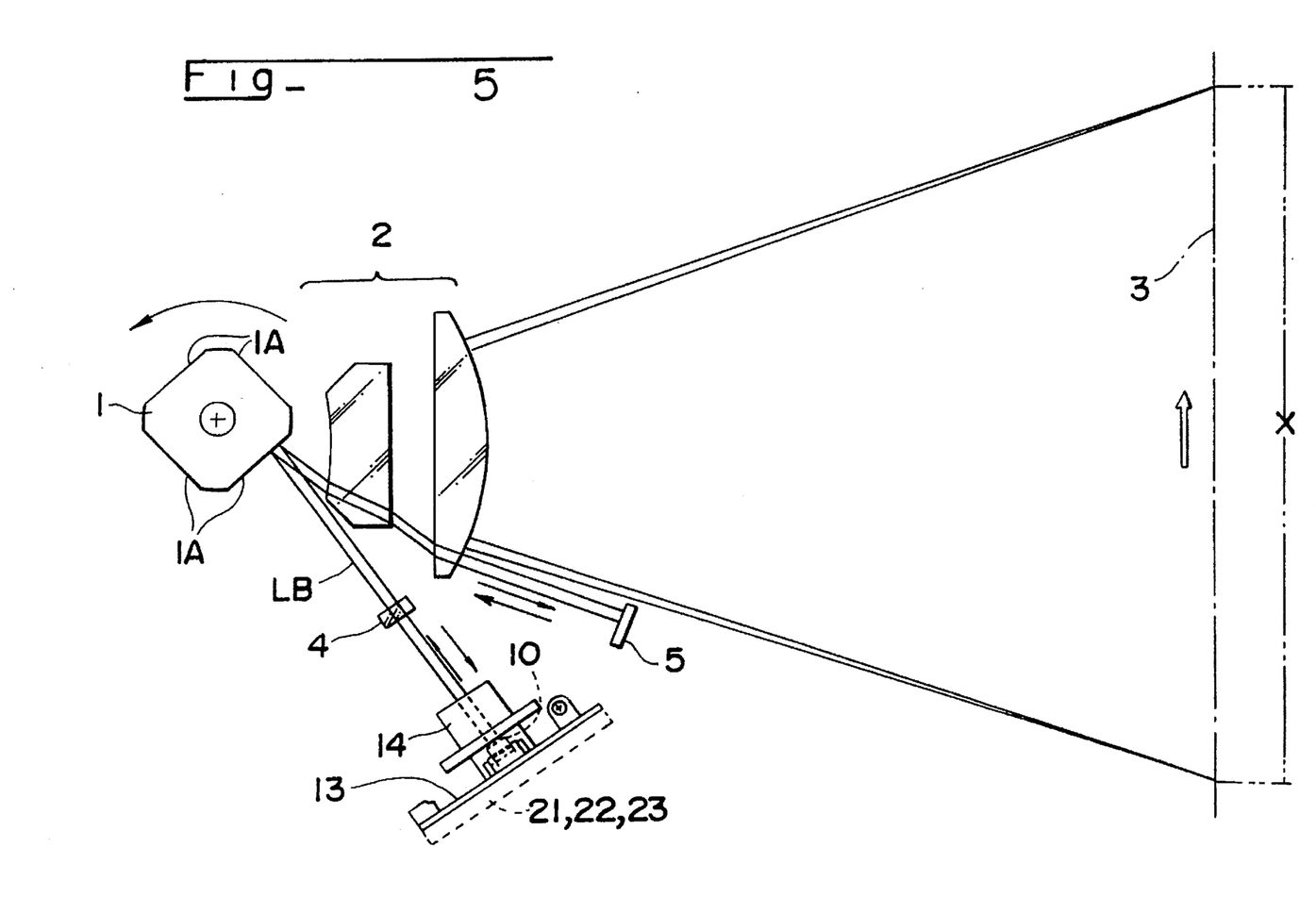
FIG. 5 is a schematic plan view of a scanning optical system showing a second embodiment of the beam position detecting device.

FIG. 5 is a schematic view of a scanning optical system employing the second embodiment of the beam position detecting device. In FIG. 5, components having the same structures and the functions as those of the first embodiment are denoted by the same reference numerals. A cross-sectional view taken along a line corresponding to the line III—III of FIG. 2 is omitted in the explanation of the second embodiment, since such a cross-sectional view is exactly the same as that of FIG. 3.

The difference between the first and second embodiments is that a reflection mirror 5, as a reflection element, is further provided in the second embodiment. The position of the reflection mirror 5 is determined to exist in an edge portion of the deflecting zone of the laser beam LB. The reflection surface 5A of the reflection mirror 5 is set to be orthogonal to the laser beam LB when the deflected laser beam LB scans the reflection mirror 5. That is, the laser beam LB, emitted from the semiconductor laser 10, reaches the reflection surface 1A of the polygon mirror 1 through the cylindrical lens 4. Then, the laser beam LB is deflected toward the reflection mirror 5 through the fθ lens 2. Since the reflection surface 5A of the reflection mirror 5 and the incident laser beam LB have a right angle, the laser beam LB, after reflected by the reflection mirror 5, advances in an opposite direction but on the same optical path. Further, the laser beam LB is reflected by the reflection surface 1A, and finally returns to the semiconductor laser 10 through the cylindrical lens 4. Therefore, the monitor photo diode 12 can detect the beam position of the laser beam LB. As described above, the output signal from the monitor photo diode 12 is utilized as a synchronous signal.

Furthermore, In this second embodiment, the reflection mirror 5 is positioned out of the scanning zone of the photoconductive drum, which is preferable to prevent the reflection mirror 5 from interfering with image- forming on the photoconductive drum 3. Namely, the laser beam LB is reflected by the reflection mirror 5, before the laser beam LB scans the predetermined angle zone X on the photoconductive drum 3.

The position of the reflection mirror 5 can be arranged so that the optical path length, from the semiconductor laser 10 to the circumferential surface of the photoconductive drum 3, becomes substantially equal to the optical path length from the semiconductor laser 10, by way of the polygon mirror 1, and the reflection mirror 5, to the semiconductor laser 10, via the fθ lens 2.

As described above, in accordance with the second embodiment constituting the beam position detecting apparatus for the laser beam scanning system, it becomes possible to omit the photo sensor which is employed in the conventional laser scanning system to detect the position of the laser beam. Thereby, the number of the parts decreases and the system becomes structurally simple, and as a result, the production cost can be reduced.

Further, as with first embodiment, it becomes possible to install a plurality of circuits relating to the actuation of the semiconductor laser and the detection of the laser beam position, on the same base plate. Therefore, additional cost reduction can be achieved.

In addition, in this embodiment, the detection of the laser beam LB can be maintained well, since the semiconductor laser 10 can be arranged at the position optically equivalent to the circumferential surface of the photoconductive drum 3, with respect to the semiconductor laser 10. That is, in this embodiment, the optical path length from the semiconductor laser 10 and the circumferential surface of the photoconductive drum 3 become substantially equal to the optical path length from the semiconductor laser 10, through the polygon mirror 1 and reflection mirror 5, to the semiconductor laser 10.

[Third embodiment]

Figure 6:
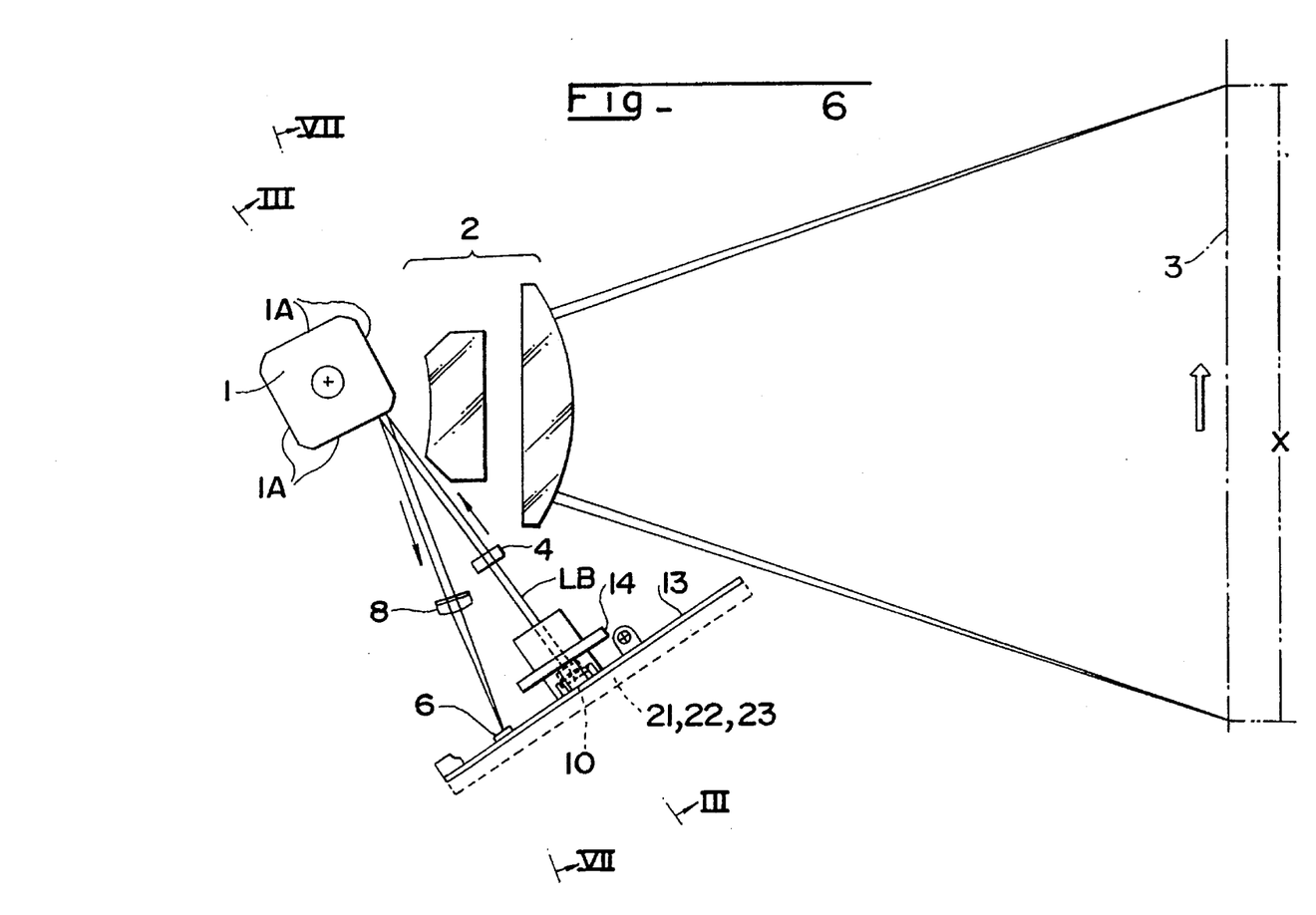
FIG. 6 is a schematic plan view of a scanning optical system showing a third embodiment of the beam position detecting device.

FIG. 6 is a schematic view showing a scanning optical system employing a third embodiment of the beam position detecting device in accordance with the present invention. In the drawing, components having the same structures and functions as those of the first embodiment are denoted by the same reference numerals. Also, a cross-sectional view which will be shown if taken along a line corresponding to the line III—III of FIG. 2, is omitted in the explanation of the third embodiment, since such a cross-sectional view is exactly the same as the cross-sectional view of FIG. 3, which has been already described in the foregoing explanation.

In the third embodiment, the semiconductor laser 10 emits the laser beam LB against the polygon mirror 1. The laser beam LB can scan the predetermined angle zone X, on the photoconductive drum 3, by rotating the polygon mirror 1, since the angle of the reflection surface 1A is changed. In this case, a photo sensor 6 is installed on the base plate 13 as well as the semiconductor laser 10. The position of the photo sensor 6 is determined to be located at a leading side of (prior to) a position of the semiconductor laser 10 when seen in a scanning direction of the laser beam LB, and is also determined to exist within the scanning zone in which the laser beam LB scans.

Accordingly, the laser beam LB scans the photo sensor 6 prior to the semiconductor laser 10. When the laser beam LB scans the photo sensor 6, the laser beam LB passes a laser beam converging lens 8, as shown in the FIG. 7, which corresponds to a cross-sectional view taken along a line VII—VII of FIG. 6.

Figure 7:
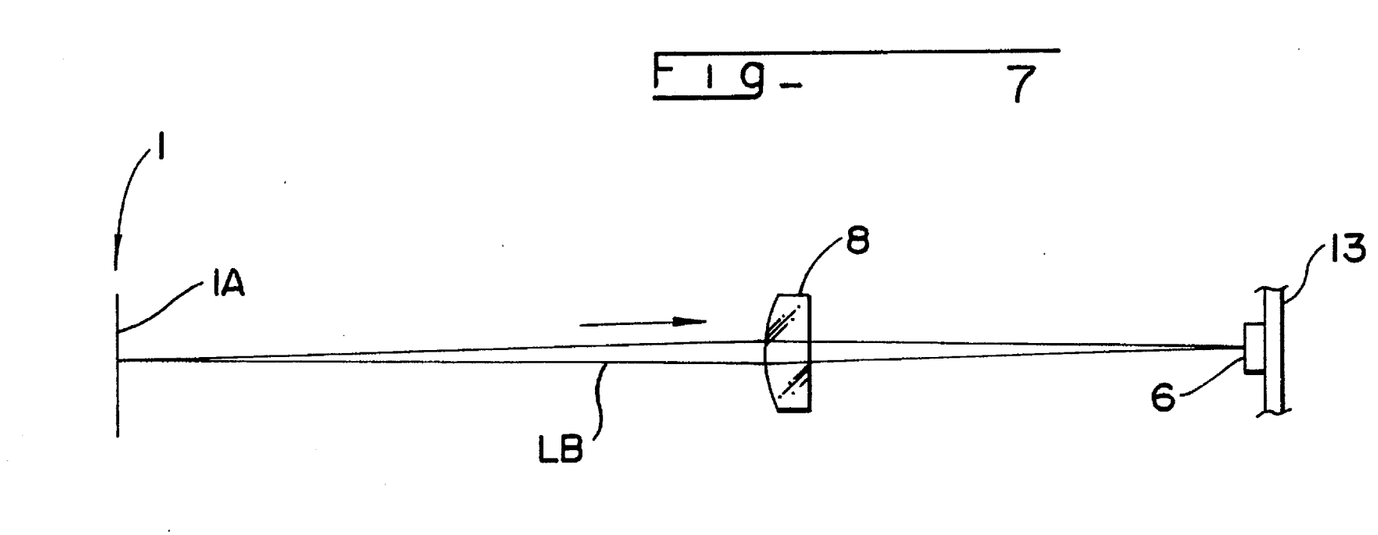
FIG. 7 is a cross-sectional view taken along a line VII—VII in FIG. 6.

The converging lens 8, which is made of optical plastic material, has a first predetermined positive magnifying power in the direction in which the laser beam LB scans (i.e. a primary scanning direction), and has a second predetermined positive magnifying power, which is different from the first predetermined positive magnifying power, in a direction orthogonal to the primary scanning direction (i.e. a secondary scanning direction). Thus, the laser beam LB is converged through the converging lens 8 in both the primary scanning direction and the secondary scanning direction so that the converged laser beam LB can satisfy a required power density on the photo sensor 6. Further, the converging lens 8 acts so as to prevent the tilt of the reflection surface 1A of the polygon mirror 1 from affecting the accuracy in the detection of the laser beam LB.

In accordance with above constitution, the laser beam LB, emitted from the semiconductor laser 10 and deflected by the polygon mirror 1, scans the photo sensor 6 prior to the predetermined angle zone X on the circumferential surface of the photoconductive drum 3. Therefore, the synchronous signal for the horizontal synchronous signal detecting circuit 23 can be obtained by the photo sensor 6.

In this third embodiment, the semiconductor laser 10 and the photo sensor 6 are mounted on the same base plate 13. The photo sensor 6 is located within the scanning zone so that the laser beam LB, emitted from the semiconductor laser 10 and deflected by the polygon mirror 1, can scan it. With this arrangement, the two independent base plates, which have been required for the semiconductor 10 and the photo sensor 6 in the conventional optical scanning system, can be integrated into one base plate. Further, the mirror which has been required to reflect the laser beam LB can be omitted. Furthermore, since the installation of the semiconductor laser 10 and the photo sensor 6 to the base element (not shown) must satisfy the severe standard established to guarantee the accurate installation, it becomes possible to accomplish the installations of the semiconductor laser 10 and the photo sensor 6 at the same time (i.e. at single installation work). Accordingly, not only the number of the parts can be decreased but the installation of the system can be facilitated, resulting in overall cost reduction.

Though the semiconductor laser 10 and the photo sensor 6 are installed on the same base plate in the third embodiment, two independent base plates may be used. In such a case, it will become possible to adjust the optical path length from the semiconductor laser 10 to the photo sensor 6 to be equal to the optical path length from the semiconductor laser 10 to the photoconductive drum 3.

As described above, in accordance with the beam position detecting device of the third embodiment, it becomes possible to omit the reflection mirror which has been employed in the conventional optical scanning system to reflect and direct the laser beam to the photo sensor 6. The laser beam LB can directly scan the photo sensor 6. Therefore, the number of the parts can be decreased and the apparatus becomes structurally simple, and as a result, the cost reduction can be realized.

Further, as well as the first embodiment, it becomes possible to install a plurality of circuits relating to the actuation of the semiconductor laser and the detection of the laser beam position on the same base plate, therefore, additional cost reduction can be achieved.

[Fourth embodiment]

Figure 8:
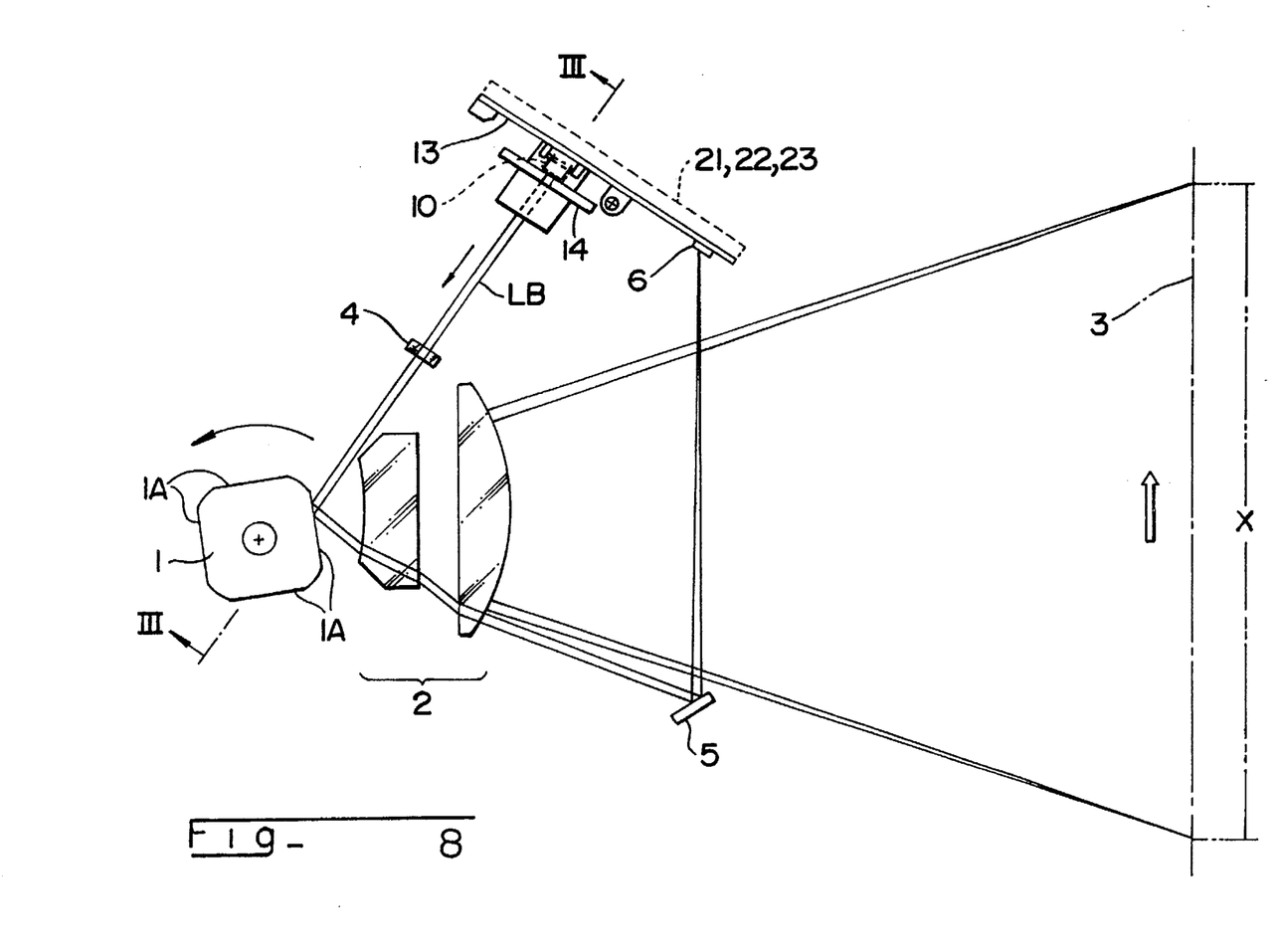
FIG. 8 is a schematic plan view of a scanning optical system showing a fourth embodiment of the beam position detecting device.

FIG. 8 is a schematic view showing a scanning optical system employing a fourth embodiment of the beam position detecting device. In the drawing, components having the same structures and functions as those of the first embodiment are denoted by the same reference numerals. Also, a cross-sectional view which would be shown if taken along a line corresponding to the line III—III of FIG. 2 is omitted in the explanation of the fourth embodiment, since such a cross-sectional view is exactly the same as the cross-sectional view of FIG. 3, which has been already described in the foregoing explanation.

In the fourth embodiment, the semiconductor laser 10 emits the laser beam LB against the polygon mirror 1 so that the laser beam LB can scan the predetermined angle zone X on the photoconductive drum 3 when the polygon mirror 1 is rotated and the angle of the reflection surface 1A is changed. The photo sensor 6 is installed on the base plate 13 as well as the semiconductor laser 10. In the fourth embodiment, the base plate 13, installing the photo sensor 6 and the semiconductor laser 10, is determined to be located at a trailing side of (behind) the predetermined angle zone X on the photoconductive drum 3, when seen in the scanning direction of the laser beam LB.

Furthermore, the reflection mirror 5, for reflecting the laser beam LB and cooperating with the photo sensor 6 to detect the laser beam position, is disposed at a position out of the predetermined angle zone X but at a leading side of (prior to) the predetermined angle zone X when seen in the scanning direction of the laser beam LB. This enables the scanning laser beam LB to be reflected by the reflection surface 5A of the reflection mirror 5, and directed to the photo sensor 6. That is, when the base plate 13 is installed, the photo sensor 6 is automatically joined with the base plate 13 so that the laser beam LB, deflected by the reflection mirror 5, can be sensed by the photo sensor 6.

Also, the optical path length between the semiconductor laser 10 and the photo sensor 6 is determined to be substantially equal to the optical path length between the semiconductor laser 10 and the photoconductive drum 3.

In accordance with the fourth embodiment, the laser beam LB, emitted from the semiconductor laser 10 and deflected by the polygon mirror 1, can be reflected by the reflection mirror 5 and directed to the photo sensor 6 prior to the scanning of the predetermined angle zone X on the circumferential surface of the photoconductive drum 3. Then, the signal detected by the photo sensor 6 is utilized as the horizontal synchronous signal for the horizontal synchronous signal detecting circuit 23.

In accordance with this embodiment, the semiconductor laser 10 and the photo sensor 6 are installed on the same base plate 13 which are located at the trailing side of (behind) the predetermined angle zone X when seen in the scanning direction of the laser beam LB. The reflection mirror 5 is located at the leading side of (prior to) the predetermined, angle zone X so that the laser beam LB, emitted from the semiconductor laser 10 and deflected by the polygon mirror 1, can be reflected toward the photo sensor 6 before the laser beam LB scans the predetermined angle zone X. Therefore, the base plate for the semiconductor laser 10 and the base plate for the photo sensor 6, which have been separately provided in the conventional optical scanning systems, are able to be combined or integrated into one base plate (i.e. the base plate 13). Accordingly, the installation of the base plate, usually requiring higher accuracy can be accomplished at only one installation operation, resulting in cost reduction by the reduction of the number of the parts and the facilitation of the installation.

Furthermore, the photo sensor 6 can be positioned at the optically equivalent position to the circumferential surface of the photoconductive drum 3, thereby, the accuracy in the detection of the laser beam scanning position can well be maintained.

As explained above, in accordance with the fourth embodiment, the semiconductor laser and the photo sensor for detecting the horizontal synchronous signal can be installed on the same base plate, therefore, it becomes possible to omit one of two base plates which have been shown in the prior art for separately installing the semiconductor laser and the laser beam position detecting device. As a result, the installation of the semiconductor laser and the photo sensor, which require accuracy in their installation work, can be accomplished at the same time. Accordingly, the number of the parts decreases and the installation is facilitated, thereby the cost reduction can be realized.

As this invention may be embodied in several forms without departing from the spirit of the essential characteristics thereof, the present embodiment is therefore illustrative and not restrictive, since the scope of the invention is defined by the appending claims rather than by the description preceding them, and all changes that fall within the metes and bounds of the claims, or equivalence of such metes and bounds are therefore intended to embraced by the claims.

The present disclosure relates to subject matters contained in Japanese Utility Model Applications Nos. HEI 2-46515 (filed on Apr. 27, 1990), HEI 2-48466 (filed on May 9, 1990) and Japanese Patent Application No.HEI 2-119180 (filed on May 9, 1990) which are expressly incorporated herein by reference in their entirety.

What is claimed is:

1. A laser scanning system for an electrophotographic image recording apparatus having a photoconductive material to be exposed to a laser beam, comprising:

a laser source for emitting said laser beam;

means for deflecting said laser beam emitted by said laser source to repeatedly scan a region that includes a predetermined angle zone;

means for receiving said laser beam deflected by said deflecting means, said receiving means being separate from said laser source and being positioned in an area of said region outside of said predetermined angle zone;

a first mounting member for mounting said deflecting means; and a second mounting member for mounting only said laser source and said light receiving means, said second mounting member being separate from said first mounting member, said laser source and said light receiving member being mounted to said second mounting member so as to have a predetermined positional relationship, wherein a horizontal synchronous signal is produced based upon said laser beam deflected by said deflecting means and received by said receiving means.

2. The laser scanning system of claim 1, wherein at least one optical element of said laser scanning system, other than said laser source and said light receiving means, is mounted to said first mounting member.

3. The laser scanning system of claim 1, wherein said deflecting means includes a rotatably drive polygon mirror.

4. The laser scanning system of claim 1, wherein said laser source includes a semiconductor laser.

5. The laser scanning system of claim 4, wherein said semiconductor laser includes a laser diode for simultaneously emitting said laser beam in a forward direction and a backward direction.

6. The laser scanning system of claim 5, wherein said semiconductor laser further includes a monitor diode positioned adjacent said laser diode for detecting a magnitude of said laser beam emitted by said laser diode.

7. The laser scanning system of claim 1, further comprising means for detecting a horizontal synchronous signal used to synchronize a scanning of said laser beam with a modulation of said laser beam.

8. The laser scanning system of claim 1, wherein said receiving means is arranged on a leading end side with respect to a scanning direction of said predetermined angle zone.

9. The laser scanning system of claim 1, wherein said receiving means is arranged on a trailing end side with respect to a scanning direction of said predetermined angle zone.

10. The laser scanning system of claim 1, further comprising a photoconductive drum that is scanned by said laser beam, said receiving means being positioned to receive said deflected laser beam prior to a scanning of said predetermined angle zone.

11. The laser scanning system of claim 1, further comprising a photoconductive drum that is scanned by said laser beam, said receiving means being positioned to receive said deflected laser beam after a scanning of said predetermined angle zone.

12. A laser scanning system for an electrophotographic image recording apparatus having a photoconductive material to be exposed to a laser beam, comprising:

a laser source for emitting said laser beam;

means for deflecting said laser beam emitted by said laser source so that said laser beam repeatedly scans a region that includes at least a predetermined angle zone;

means for receiving said deflected laser beam outside said predetermined angle zone scanned by said deflected laser beam;

means for reflecting said laser beam deflected by said deflected means to said receiving means; and a mounting member for mounting said laser source and said receiving means, wherein said reflection means is arranged so that an optical path length of said laser beam from said laser source to a surface of said photoconductive material to be exposed to said laser beam is substantially equal to an optical path length from said laser source to a light receiving member of said receiving means.

13. The laser scanning system of claim 12, further comprising another mounting member for mounting said deflecting means, said mounting member being separate from said another mounting member.

14. The laser scanning system of claim 12, wherein at least one optical element of said laser scanning system, other than said laser source and said light receiving means, is mounted to another mounting member together with said deflecting means.

15. The laser scanning system of claim 12, wherein said laser source comprises a laser diode for simultaneously emitting said laser beam in a forward direction and a backward direction.

16. The laser scanning system of claim 15, wherein said laser source further comprises a monitor diode positioned adjacent to said laser diode for detecting a magnitude of said laser beam emitted by said laser diode.

17. The laser scanning system of claim 12, further comprising means for detecting a horizontal synchronous signal used to synchronize a scanning of said laser beam with a modulation of said laser beam.

18. A laser scanning system for an electrophotographic image recording apparatus having a deflector that deflects a beam of light through an optical system to scan a surface of a photoconductive drum, said deflector and said optical system being mounted to a first mounting member, including:

a light source for emitting said beam of light;

means for receiving said deflected beam of light, said receiving means being separate from said light source;

a second mounting member for mounting only said light source and said receiving means, said light source and said receiving means being mounted to said second mounting member so as to have a predetermined positional relationship, said second mounting member being separate from said first mounting member; and means for detecting a horizontal synchronous signal, generated by said receiving means in response to said beam of light deflected to said receiving means, that is used to synchronize a scanning of said beam of light with a modulation of said beam of light.

19. The laser scanning system of claim 18, further comprising means for controlling a power output of said light source.

20. The laser scanning system of claim 18, wherein an optical path length of said beam of light emitted from said light source to said surface is substantially equal to an optical path length from said light source to said receiving means.

21. The laser scanning system of claim 1, wherein an optical path length of said emitted laser beam from said laser source to said photoconductive material to be exposed to said laser beam is substantially equal to an optical path length from said laser source to said receiving means.

22. The laser scanning system of claim 12, wherein only said laser source and said receiving means are mounted on said mounting member, said laser source and said receiving means being mounted on said mounting member so as to have a predetermined positional relationship.

* * * * *

UNITED STATES PATENT AND TRADEMARK OFFICE
CERTIFICATE OF CORRECTION

PATENT NO. : 5,497,184
DATED : March 5, 1996
INVENTOR(S) : Taizo SAITO et al.

It is certified that error appears in the above-indentified patent and that said Letters Patent is hereby corrected as shown below:

On the cover, in section [75], "Inventors:", line 2, change "Kawagoe" to ---Saitama-ken---.
On the cover, in section [75], "Inventors:", line 2, change "Kiyose" to ---Tokyo---.
On the cover, in section [75], "Inventors:", line 3, change "Sakado" to ---Saitama-ken---.
On the cover, prior to "[56] References Cited", insert
---[30] Foreign Application Priority Data
    Apr. 27, 1990  [JP] Japan...............2-46515
    May 9, 1990   [JP] Japan...............2-48466
    May 9, 1990   [JP] Japan...............2-119180---.

At column 12, lines 46 and 47 (claim 18, lines 5 and 6), change "including" to ---comprising---.

Signed and Sealed this

Twenty-fifth Day of June, 1996

Attest:

BRUCE LEHMAN

*Attesting Officer*    *Commissioner of Patents and Trademarks*